(12) United States Patent
Haller

(10) Patent No.: US 11,208,013 B2
(45) Date of Patent: Dec. 28, 2021

(54) VEHICLE SEAT WITH SCISSOR FRAME

(71) Applicant: GRAMMER AG, Amberg (DE)

(72) Inventor: Erwin Haller, Amberg (DE)

(73) Assignee: GRAMMER AG, Ursensollen (DE)

( * ) Notice: Subject to any disclaimer, the term of this patent is extended or adjusted under 35 U.S.C. 154(b) by 0 days.

(21) Appl. No.: 16/922,694

(22) Filed: Jul. 7, 2020

(65) Prior Publication Data
US 2021/0009010 A1    Jan. 14, 2021

(30) Foreign Application Priority Data

Jul. 9, 2019  (DE) .......................... 102019118514.9

(51) Int. Cl.
*B60N 2/16*     (2006.01)
*B60N 2/50*     (2006.01)
B60N 2/52     (2006.01)

(52) U.S. Cl.
CPC .............. *B60N 2/162* (2013.01); *B60N 2/502* (2013.01); *B60N 2/527* (2013.01)

(58) Field of Classification Search
CPC ........ B60N 2/162; B60N 2/508; B60N 2/502; B60N 2/527
USPC .......................... 297/344.15; 248/188.2, 421
See application file for complete search history.

(56) References Cited

U.S. PATENT DOCUMENTS 5,950,977 A * 9/1999 Proksch ................. B60N 2/508
248/421

FOREIGN PATENT DOCUMENTS

| DE | 10206223 | 9/2003 | |
|---|---|---|---|
| FR | 737621 A * | 12/1932 | ............ B60N 2/546 |
| JP | H09-323896 | 12/1997 | |

OTHER PUBLICATIONS

Official Action for German Patent Application No. 102019118514.9, dated Mar. 23, 2020, 2 pages.
Extended European Search Report for European Patent Application No. 20182904, dated Dec. 2, 2020, 7 pages.

* cited by examiner

Primary Examiner — Milton Nelson, Jr.
(74) Attorney, Agent, or Firm — Sheridan Ross P.C.

(57) ABSTRACT

A vehicle seat is provided with an upper part which is height-adjustably mounted with respect to a lower part by at least one scissor frame, where the scissor frame has a first scissor arm member and a second scissor arm member which are pivotally mounted about a common axis, where the first scissor arm member has a first, a second and a third lever member which are series-connected, where the first lever member is pivotally mounted with respect to the upper part about a third axis, where the third lever member is pivotally mounted with respect to the lower part about a fourth axis, and where the second lever member is pivotally mounted about the common axis and is rotationally connected to the first lever member by a fifth axis and rotationally connected to the third lever member by a sixth axis.

19 Claims, 6 Drawing Sheets

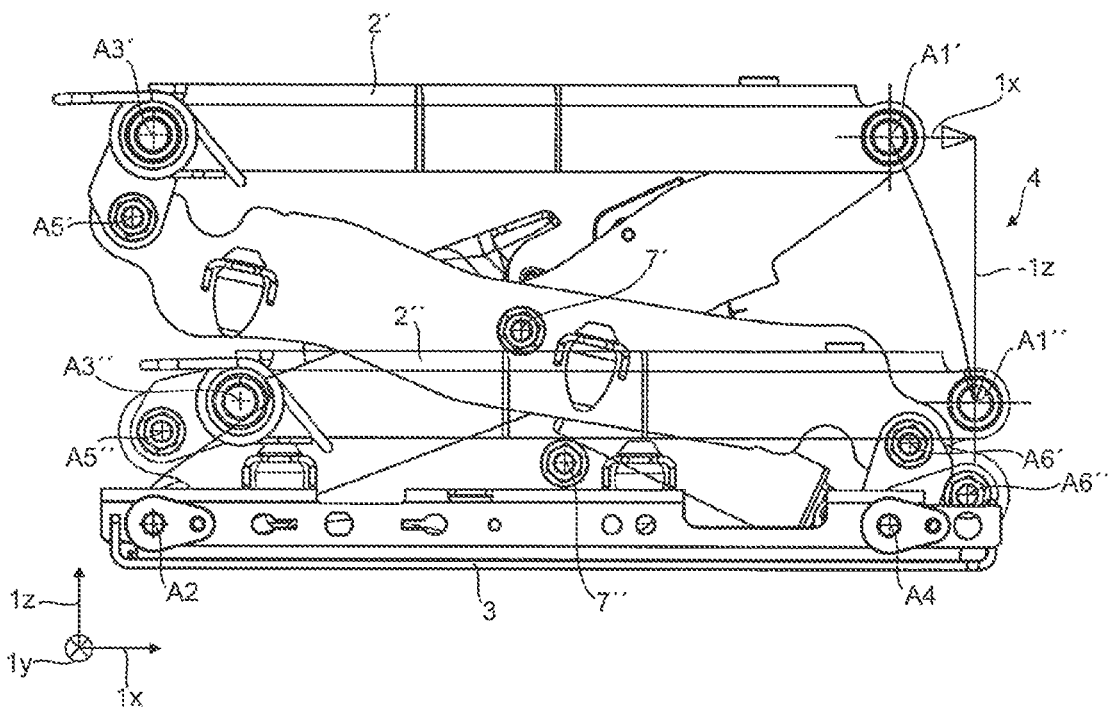
Fig. 5
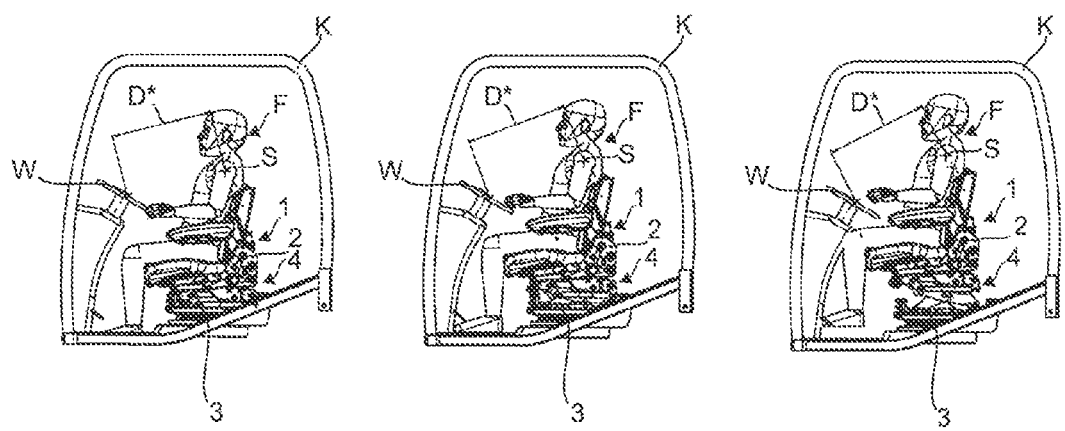
Fig. 6a　　　Fig. 6b　　　Fig. 6c
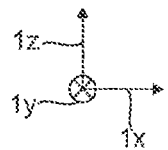

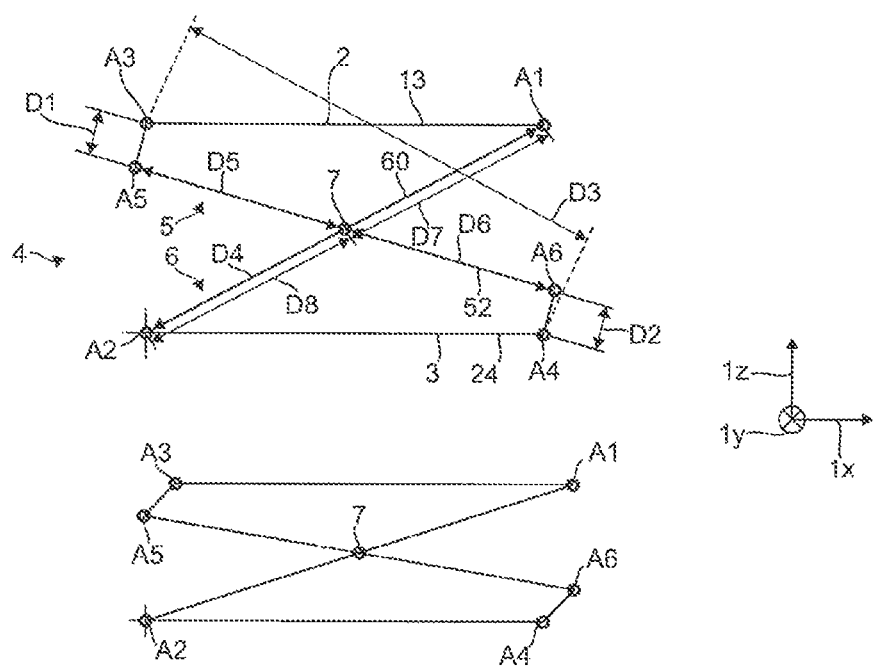
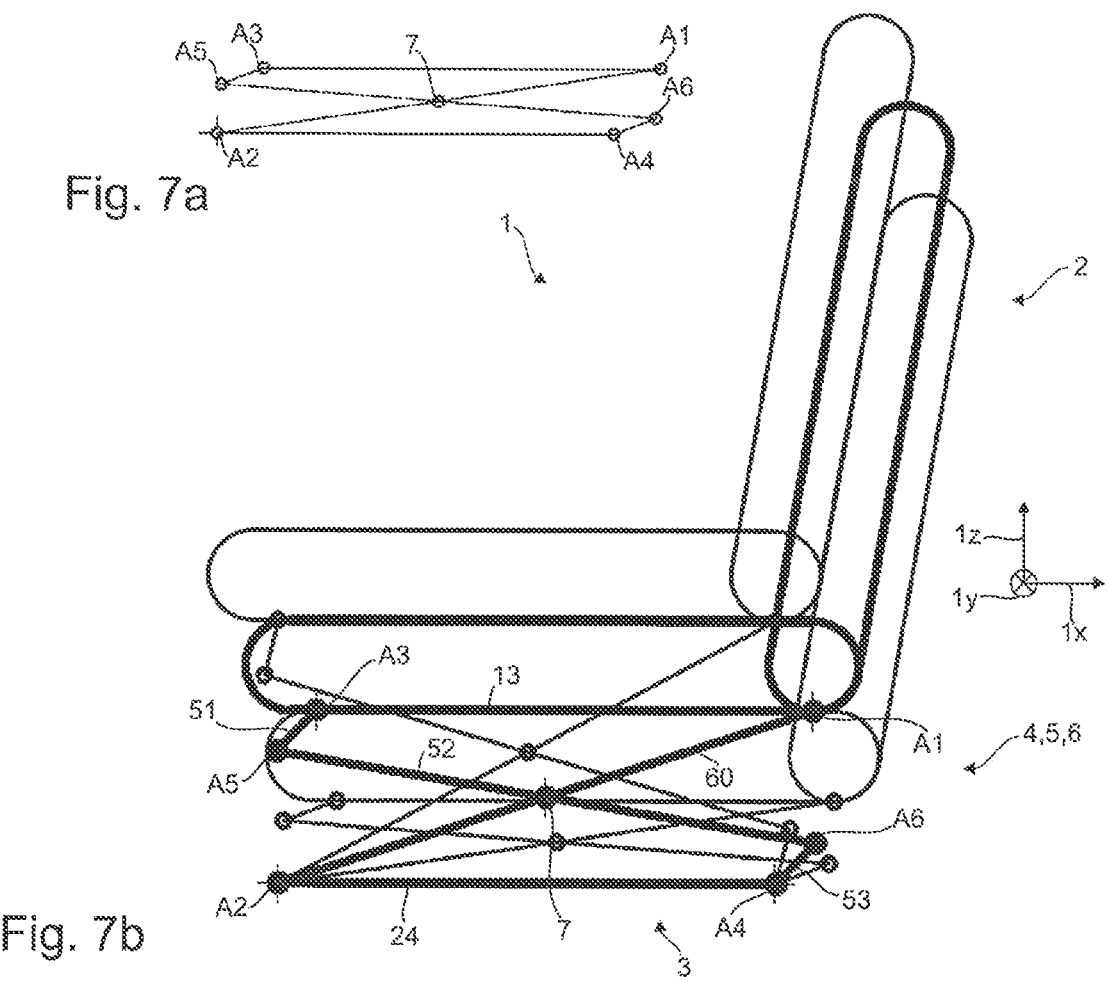
Fig. 7a
Fig. 7b

VEHICLE SEAT WITH SCISSOR FRAME

CROSS-REFERENCE TO RELATED APPLICATION

This application claims the benefit of German Patent Application No. 10 2019 118 514.9 filed Jul. 9, 2019, the entire contents of which are incorporated herein by reference in its entirety.

FIELD

The invention relates to a vehicle seat having an upper part which is height-adjustably mounted with respect to a lower part by means of at least one scissor frame, wherein the scissor frame comprises a first scissor arm member and a second scissor arm member which are pivotally mounted about a common axis, wherein the second scissor arm member comprises an integral fourth lever member which is pivotally mounted with respect to the upper part about a first axis and with respect to the lower part about a second axis. The present invention is therefore based on the kinematics of a scissor system.

BACKGROUND

Generic vehicle seats, particularly for commercial vehicles and especially for agricultural vehicles, are already known from the prior art. Also known are generic scissor frames, which serve not only as a height adjustment of a seat in a motor vehicle, but also as a suspension of the seat, in particular to increase the seating comfort for a driver or to ensure good seating comfort, for example when the vehicle is moved on uneven ground.

Such scissor frames comprise, as described above, a first scissor arm member and a second scissor arm member, which are pivotally mounted about a common axis. One of the ends of the scissor arm members is rotationally connected to the upper part and the other of the ends of the scissor arm members is rotationally connected to the lower part of the vehicle seat. Additionally, spring members and/or damper members can be arranged between the upper part, the lower part and/or the scissor frame.

According to the prior art, for example, in the front longitudinal direction of the seat, the first end of the first scissor arm member is connected to the upper part by means of a fixed bearing and the first end of the second scissor arm member is connected to the lower part by means of a fixed bearing. For example, in the rear longitudinal direction of the seat, the second end of the first scissor arm member is connected to the lower part by means of a floating bearing and the second end of the second scissor arm member is connected to the upper part by means of a floating bearing. Known systems use floating bearings in the form of slides or rollers for compensation of the movement in the longitudinal direction of the seat during lifting in the seat height direction. The advantage of these sliding or roller-guided systems are the low manufacturing costs. However, the disadvantage of these systems is the minimum clearance required for smoothly running systems, which is has negative effects in practice.

Scissor suspensions with linear guides are also known. Although these are of high quality, they also have correspondingly high manufacturing costs.

The design of a scissor frame with a one-sided arrangement of two joints for compensation in the longitudinal direction of the seat is also known. Both scissor arm members thus comprise, for example, two lever arms each, which are connected in series and interconnected by means of a rotary joint. According to the prior art, these joints or rotary joints are either both arranged at the front or both at the rear as viewed in the longitudinal direction of the seat. The fixed bearings are located on the side of the rotary joints.

An advantage of these systems is the higher rigidity and durability of the assembly. However, the disadvantage here are the higher manufacturing costs. In addition, with joints placed on one side, no plane-parallel vertical movements between the upper part and the lower part can be performed. Moreover, with the position of the scissor arms towards each other, the distance between the operating members, which are arranged in front of the vehicle seat and are gripped by the driver's hand (example: steering wheel), and the driver's shoulder joint changes constantly, so that the driver must constantly compensate for this change by a corresponding movement of his body.

SUMMARY

It is therefore an object of the present invention to develop a vehicle seat with a scissor frame which offers a solution that is both economical and ergonomic.

The object of the invention is achieved by a vehicle seat having an upper part, which is height-adjustably mounted with respect to a lower part by means of at least one scissor frame, wherein the scissor frame comprises a first scissor arm member and a second scissor arm member, which are pivotally mounted about a common axis, wherein the second scissor arm member comprises an integral fourth lever member, which is pivotally mounted with respect to the upper part about a first axis and with respect to the lower part about a second axis, wherein the first scissor arm member comprises a first, a second and a third lever member which are series-connected, wherein the first lever member is pivotally mounted with respect to the upper part about a third axis, and wherein the third lever member is pivotally mounted with respect to the lower part about a fourth axis, wherein the second lever member is pivotally mounted about the common axis and is rotationally connected to the first lever member by means of a fifth axis and rotationally connected to the third lever member by means of a sixth axis.

The first scissor arm member is thus formed by a first, a second and a third lever member, which are series-connected. The difference between the present invention with respect to the prior art is therefore that the rotary joints, which as described above are formed by the fifth and the sixth axis, are both arranged on the same scissor arm member. These two rotary joints are located diagonally opposite each other in relation to the common axis and are responsible for the compensation in the longitudinal direction of the vehicle seat that is required for height adjustment of the scissor frame. Moreover, the kinematics of the suspension or height adjustment of the upper part and the lower part are mechanically clearly determined by the rotary joints. Preferably, except for the fifth and sixth axis and except for the linkage to the upper part by means of the third axis and the linkage to the lower part by means of the fourth axis, the first scissor arm member is otherwise free from further rotary joints.

Preferably, the first, second, third, fourth, fifth and sixth axes and the common axis are all arranged to run parallel to each other and/or parallel to the width direction of the seat.

It should be noted that in the context of the present invention, the positional information (for example, front, rear, top, bottom, left, right, etc.) and directional information (height direction, longitudinal direction, width direction) are always defined in relation to the vehicle seat. Global influences, such as a downward slope of a vehicle comprising the vehicle seat and a resulting deflection of the vehicle seat are, however, not relevant.

The second scissor arm member between the first and the second axis is, in contrast to the first scissor arm member, formed as described without rotary joints and connects the lower part directly to the upper part as an integral, inherently rigid component.

Preferably, the connections of the scissor frame to the upper part and to the lower part are free of translational degrees of freedom and/or preferably have only one rotational degree of freedom each. This rotational degree of freedom is formed in each case by means of one of the rotary bearings, which are formed by the first, the second, the third and the fourth axis, and by means of which the two scissor arm members are connected to the upper part and to the lower part as described above. The connections of the scissor frame to the upper part and to the lower part are therefore preferably formed exclusively by means of fixed bearings.

The advantage of the invention is that the movement sequence of this scissor suspension having diagonally arranged joints is designed in such a way that the distance between the shoulder joint and the contact region of the driver's hand with the operating members undergoes little or no change in all positions of the scissor arms relative to each other.

Preferably, a vehicle seat comprises exactly two such scissor frames, which are arranged at a distance from each other in the seat width direction. Preferably, both scissor frames are arranged mirror-symmetrically to a virtual plane, which is parallel to a longitudinal direction and to a height direction of the vehicle seat.

According to an advantageous embodiment, it is provided that in relation to a longitudinal direction of the vehicle seat, the third axis and the second axis are arranged at a front end of the vehicle seat. By means of this mechanism, it is preferably ensured that the upper part, when moving in the direction of the lower part (i.e. downwards), moves backwards at the same time, as seen in the longitudinal direction of the vehicle seat. Analogously, the upper part moves forwards when moving away from the lower part (i.e. upwards) at the same time, as seen in the longitudinal direction of the vehicle seat.

In order to ensure a sufficiently large pivoting of the mechanism, it has proven to be best if the fourth lever member is longer than the second lever member and/or if the second lever member is longer than the first lever member and/or if the second lever member is longer than the third lever member.

Furthermore, it is advantageous if a first distance between the third axis and the fifth axis is identical to a second distance between the fourth axis and the sixth axis. It is therefore advantageous if the length of the first lever member is equal to the length of the third lever member. Preferably, the first lever member is formed identically to the third lever member. This ensures that constructionally identical parts can be used, which reduces the costs.

Moreover, it is advantageous if a third distance between the third axis and the fourth axis is smaller than a fourth distance between the first axis and the second axis. It is therefore preferable that the tripartite division of the first scissor arm member is taken into account during the selection of the distances between the axes, so that the upper part and the lower part can be arranged parallel to each other at least in the non-deflected initial state of the scissor frame.

In the context of the present invention, the scissor frame can be deflected upwards by a distance starting from the non-deflected initial state in order to reach a first maximum state, which is defined by the largest possible distance between the upper part and the lower part. Starting from the non-deflected initial state, the scissor frame can further be deflected downwards by the same distance to reach a second maximum state, which is defined by the smallest possible distance between the upper part and the lower part.

Moreover, it is advantageous if, in relation to a height direction of the vehicle seat, a location of the first axis is identical to a location of the third axis and/or a location of the second axis is identical to a location of the fourth axis. In other words, the two axes which serve as a link between the scissor frame and the upper part and the two axes which serve as a link between the scissor frame and the lower part are arranged at the same height with respect to one another. In relation to the first and the third axis, this is advantageous at least in the non-deflected initial state of the scissor frame. If the scissor frame is a parallel scissor frame, this applies regardless of the state of the scissor frame with relation to a pivoting about the common axis.

It is further preferable that a relative position of the third axis, the fourth axis, the fifth axis and/or the sixth axis to the common axis is in each case adjustable in the longitudinal direction and/or in the height direction of the vehicle seat. For example, a displacement unit is arranged for this purpose, by means of which the corresponding relative position can be changed. This allows the oscillation characteristics of the scissor frame to be individually adjustable.

Another preferred embodiment provides that, in relation to the longitudinal direction of the vehicle seat, a location of the first axis is different from a location of the fourth axis and/or a location of the third axis is different from a location of the second axis. This takes into account the difference between the first scissor arm member and the second scissor arm member.

Moreover, a fifth distance between the fifth axis and the common axis is preferably identical to a sixth distance between the sixth axis and the common axis. It is thus described that the second lever member, in relation to its longitudinal extension, is preferably mounted exactly centrally about the common axis.

Further, a seventh distance between the first axis and the common axis is preferably identical to an eighth distance between the second axis and the common axis. It is thus described that the fourth lever member, in relation to its longitudinal extension, is preferably mounted exactly centrally about the common axis.

For the present invention, two embodiments in particular are now preferred.

A first preferred embodiment provides that in the event of an oscillation of the scissor frame, i.e. a twisting of the scissor arm members about the common axis, a connecting line between the first and the third axis can always be mapped parallel to an initial position of the connecting line regardless of the momentary position of the scissor arm members relative to each other. For example, this connecting line is always parallel to the longitudinal direction of the vehicle seat and/or to a connecting line between the second and the fourth axis. It is thus described that the oscillation of the scissor frame causes a change in the location of the connecting line between the first and the third axis only in relation to a pure translation in the longitudinal direction and in the height direction of the vehicle seat. This first embodiment is called a "parallel scissor frame" in the context of the present invention.

A parallel scissor frame is present, for example, if it has point symmetry in relation to a point of symmetry, wherein the point of symmetry is formed by the common axis. This point symmetry is considered in a plane which is spanned by the longitudinal direction and the height direction of the vehicle seat. For example, in a parallel scissor frame, a ninth distance between the first axis and the third axis is the same as a tenth distance between the second axis and the fourth axis.

A second preferred embodiment provides that during the oscillation of the scissor frame, the connecting line between the first and the third axis is arranged with a variable degree of inclination to the connecting line between the second and the fourth axis, depending on the momentary position of the scissor arm members relative to each other. It is thus described that the oscillation of the scissor frame causes a change in the location of the connecting line between the first and third axes in relation to a translation in the longitudinal direction and in the height direction of the vehicle seat as well as in relation to a rotation about a virtual axis extending in the width direction of the seat. This second embodiment is called a "non-parallel scissor frame" in the context of the present invention.

A non-parallel scissor frame is present, for example, if at least in its initial state it has no point symmetry in relation to the point of symmetry formed by the common axis. This point symmetry is considered in a plane which is spanned by the longitudinal direction and the height direction of the vehicle seat.

It is assumed that the connecting line between the first and third axis is aligned preferably parallel to a seat surface. According to the first embodiment, the seat surface only undergoes a displacement and, according to the second embodiment, a change in its degree of inclination.

BRIEF DESCRIPTION OF THE DRAWINGS

Further advantages, objects and characteristics of the present invention are explained based on the attached drawings and the following description, in which a vehicle seat is represented and described by way of example with differently formed guide devices.

In the drawings:

FIG. 5 is the view according to FIG. 2 superimposed by a side view of the scissor frame according to FIG. 1;

FIG. 6a, 6b, 6c are representations of a vehicle cab and a vehicle seat in different height positions;

FIG. 7a; 7b are schematic representations of the kinematics of a first embodiment of the present invention;

DETAILED DESCRIPTION

Figure 1:
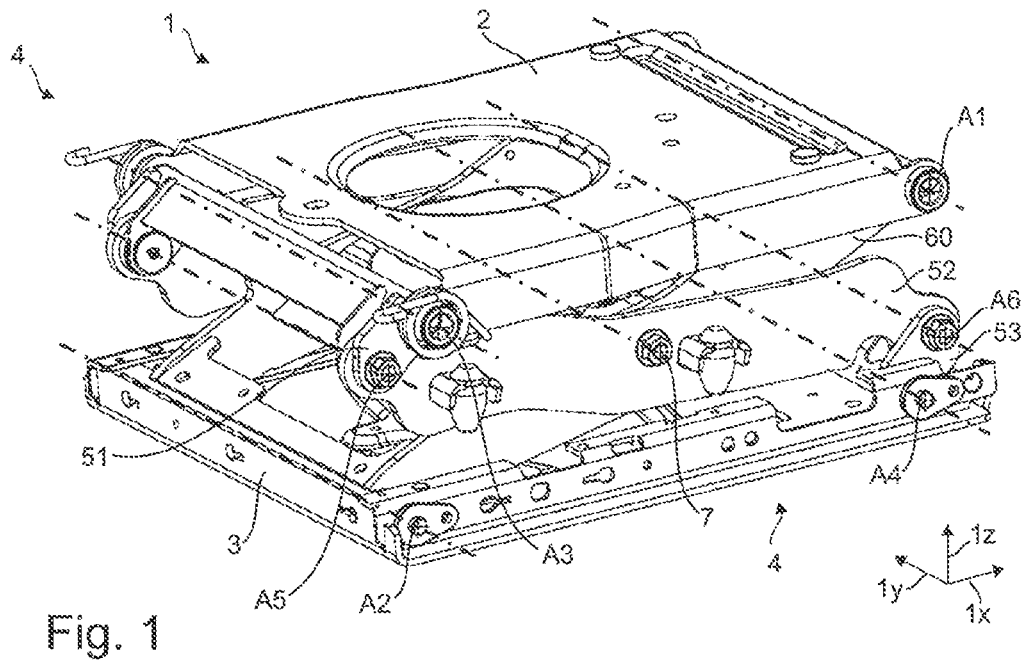
FIG. 1 is a perspective view of a scissor frame for a vehicle seat in a second maximum position.

It should be mentioned that for a better overview some components are not represented in some of the drawings. FIGS. 1 to 4, for example, show no seat part and no backrest of vehicle seat 1. According to FIGS. 7a and 8a, in each case only the top representation has all the reference signs; the two lower representations have only the reference signs for axes A1 to 7. According to FIGS. 7b and 8b, only the initial state of the vehicle seat 1 (central state of the scissor frame 4 in relation to the distance between the upper part 2 and the lower part 3, represented by bold lines) is marked with reference signs.

Moreover, the illustrations are each provided with a Cartesian coordinate system, which has the three axes 1x (longitudinal direction of the vehicle seat 1 from front to back corresponding to the direction of the arrow), 1y (width direction of the vehicle seat 1 from left to right corresponding to the direction of the arrow) and 1z (height direction of the vehicle seat 1 from bottom to top corresponding to the direction of the arrow).

FIGS. 6a-c, 7b and 8b show a vehicle seat 1 according to the invention having an upper part 2, which is height-adjustably mounted with respect to a lower part 3 by means of a scissor frame 4. A further scissor frame 4 is arranged parallel to the first scissor frame 4 and shown according to FIG. 1. In addition, spring members 9 formed as leg springs are arranged between the upper part 2 and the scissor frame 4, and a damper member 8 formed as a hydraulic damper is arranged between the lower part 3 and the scissor frame 4.

The scissor frame 4 comprises a first scissor arm member 5 and a second scissor arm member 6, which are pivotally mounted about a common axis 7. The second scissor arm member 6 comprises an integral fourth lever member 60, which is pivotally mounted with respect to the upper part 2 about a first axis A1 and with respect to the lower part 3 about a second axis A2.

The first scissor arm member 5 comprises a first 51, a second 52 and a third lever member 53, which are series-connected. The first lever member 51 is pivotally mounted with respect to the upper part 2 about a third axis A3. The third lever member 53 is pivotally mounted with respect to the lower part 3 about a fourth axis A4. The second lever member 52 is pivotally mounted about the common axis 7 as well as rotationally connected about a fifth axis A5 to the first lever member 51 and rotationally connected about a sixth axis A6 to the third lever member 53.

The rotary joints, which are formed by the fifth axis A5 and the sixth axis A6 as described above, are both located on the same scissor arm member 5. These two rotary joints and thus the two axes A5 and A6 lie diagonally opposite each other with respect to the common axis 7.

The second scissor arm member 6 between the first A1 and the second axis A2 is, as shown, without rotary joints and is inherently rigid and directly connects the lower part 3 to the upper part 2.

The connections of the scissor frame 4 to the upper part 2 and to the lower part 3 are each formed free of translational degrees of freedom and have only one rotational degree of freedom each. This rotational degree of freedom is formed respectively by means of one of the pivot bearings, which are formed by the first A1, the second A2, the third A3 and the fourth axis A4, and by means of which the two scissor arm members 5 and 6 are connected to the upper part 2 and to the lower part 3 as described above. The connections of the scissor frame 4 to the upper part 2 and to the lower part 3 are therefore formed exclusively by means of fixed bearings.

The advantage of the invention is that the motion sequence of this scissor suspension having diagonally arranged joints is designed in such a way that the distance between the shoulder joint and the contact region of the driver's hand with the control members (hereinafter referred to as the ergonomic distance D*) undergoes little or no change in all positions of the scissor arms 5 and 6 relative to each other. This shows a comparison of FIGS. 6*a*, 6*b* and 6*c*, each of which show a vehicle cab K with a vehicle seat 1 according to the invention, a driver F with shoulder joint S and an operating member W formed as a steering wheel.

According to FIG. 6*b*, the scissor frame 4 is in an undeflected initial state. According to FIG. 6*a*, the scissor frame 4 is retracted to the maximum so that the smallest possible distance is formed between the upper part 2 and the lower part 3. According to FIG. 6*c*, the scissor frame 4 is extended to the maximum so that the largest possible distance is formed between the upper part 2 and the lower part 3. In all three positions of the scissor frame 4, it is ensured that the ergonomic distance D* between the operating member W and the shoulder joint S of the driver F does not change or changes only slightly.

Figure 2:
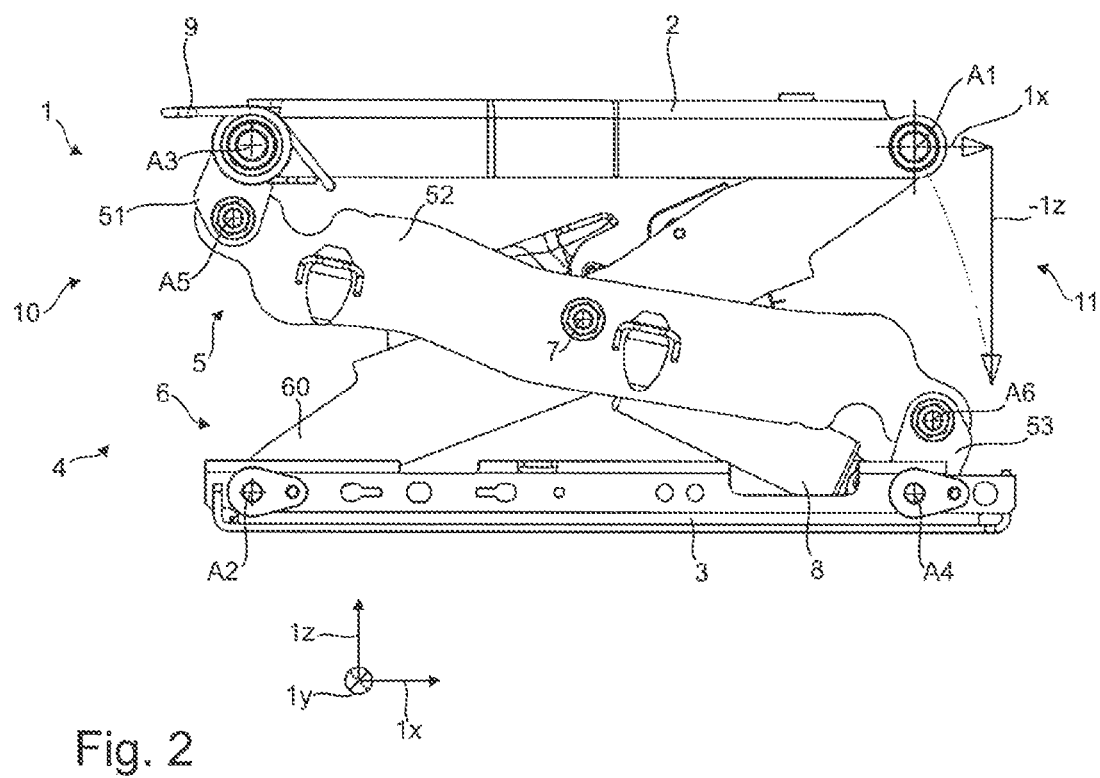
FIG. 2 is a side view of the scissor frame according to FIG. 1 in a first maximum position.
Figure 3:
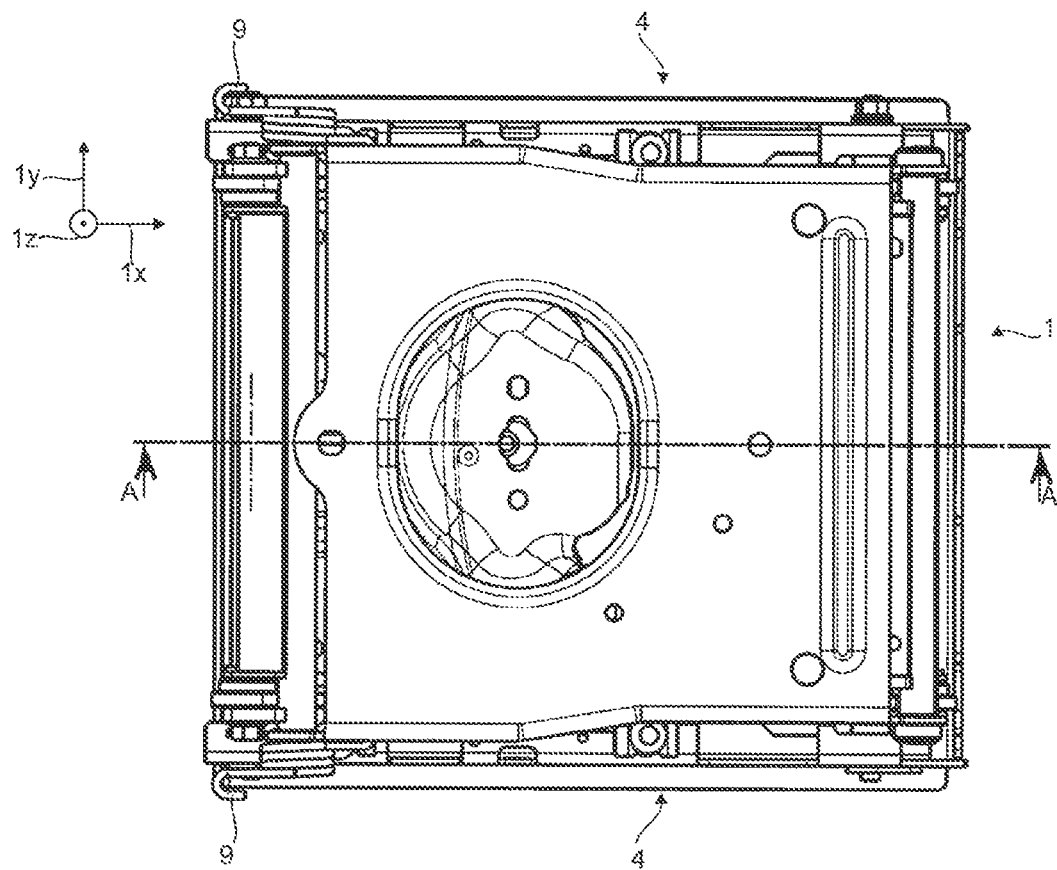
FIG. 3 is a top view of the scissor frame according to FIG. 1.
Figure 4:
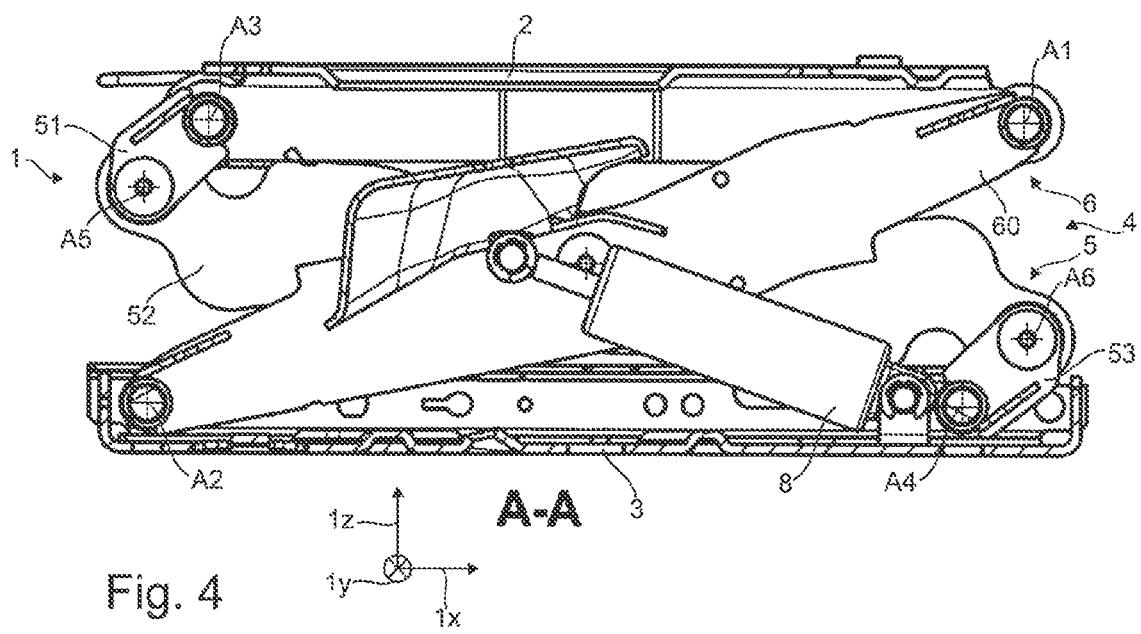
FIG. 4 is a cross section of the scissor frame according to FIG. 3.

According to FIG. 2, it is clearly shown that in relation to a longitudinal direction 1*x* of the vehicle seat 1 the third axis A3 and the second axis A2 are arranged at a front end 10 of the vehicle seat 1 (the rear end 11 of the vehicle seat 1 is also marked). By means of this mechanism, it is ensured that the upper part 2 during a movement in the direction of the lower part 3 (i.e. in the height direction 1*z* downwards −1*z*) simultaneously moves backwards, as seen in the longitudinal direction 1*x* of the vehicle seat 1 (see the two arrows according to FIG. 2, which are marked 1*x* and −1*z* as in FIG. 5).

FIG. 2 and also the schematic illustrations in FIGS. 7*a* to 9*b* show that the fourth lever member 60 is longer than the second lever member 52. Moreover, it is shown that the second lever member 52 is in the present case longer than the first lever member 51 and that the second lever member 52 is in the present case longer than the third lever member 53.

Furthermore, according to FIG. 7*a* (uppermost representation) it is shown that a first distance D1 between the third axis A3 and the fifth axis A5 is identical to a second distance D2 between the fourth axis A4 and the sixth axis A6. In the present case, a length of the first lever member 51 is equal to a length of the third lever member 53. The first lever member 51 is also identical to the third lever member 53.

Moreover, it is shown that a third distance D3 between the third axis A3 and the fourth axis A4 is smaller than a fourth distance D4 between the first axis A1 and the second axis A2.

It is further shown that in relation to a height direction 1*z* of the vehicle seat 1, a location of the first axis A1 is identical to a location of the third axis A3 and/or a location of the second axis A2 is identical to a location of the fourth axis A4. In other words, the two axes A1 and A3, which serve as a link between the scissor frame 4 and the upper part 2, and the two axes A2 and A4, which serve as a link between the scissor frame 4 and the lower part 3, are arranged at the same height. In relation to the first A1 and the third axis A3, this applies in the present case at least in the non-deflected initial state of the scissor frame.

Figure 9A:
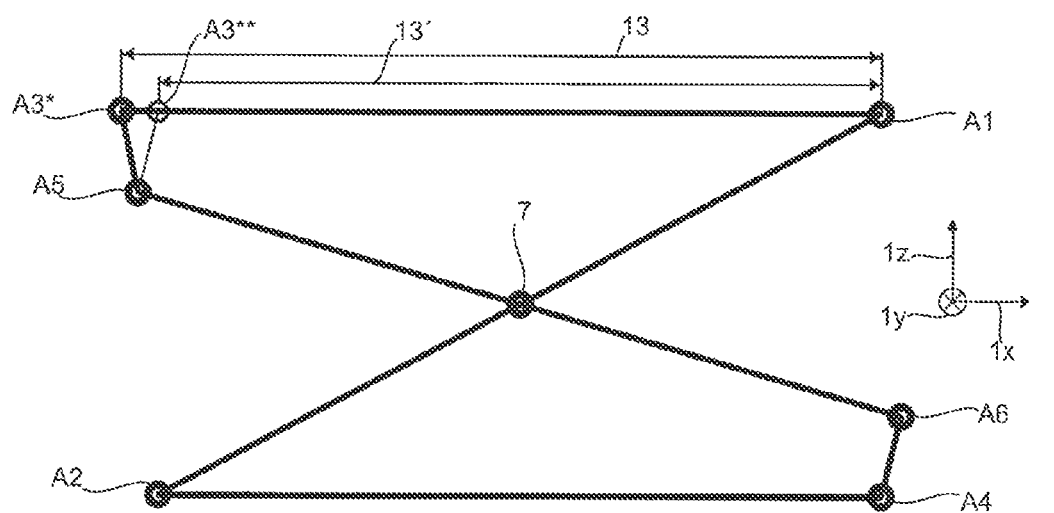
FIG. 9a; 9b are schematic representations of the kinematics of a third and a fourth embodiment of the present invention.
Figure 9B:
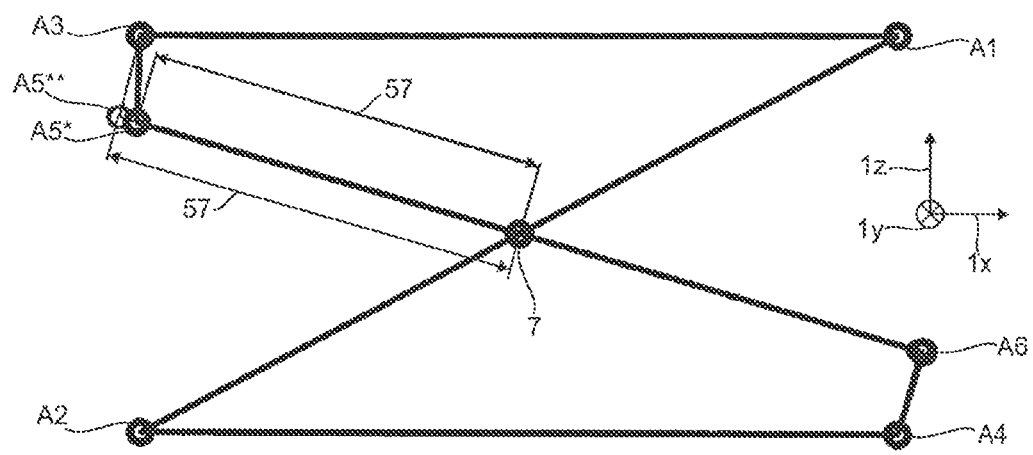
Figure 9B:
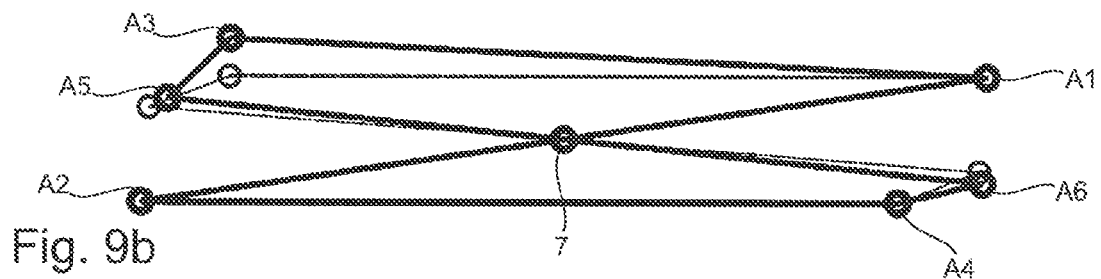

Further, according to the present scissor frame 4 a relative position of the third axis A3 to the common axis 7 is adjustable in the longitudinal direction 1*x* of the vehicle seat 1 (see comparison of the locations A3* and A3 and the resulting change in length of the connecting line 13 between the axes A1 and A3* to the connecting line 13' between the axes A1 and A3** according to the upper representation of FIG. 9***a*).

Furthermore, according to the present scissor frame 4 a relative position of the fifth axis A5 to the common axis 7 is adjustable in the longitudinal direction 1*x* and height direction 1*z* of the vehicle seat 1 (see comparison of the locations A5* and A5 and the resulting change in length of the connecting line 57 between the axes 7 and A5* to the connecting line 57' between the axes 7 and A5** according to the upper representation of FIG. 9***b*). This allows the oscillation characteristics of the scissor frame 4 to be individually adjusted.

It is also shown that in relation to the longitudinal direction 1*x* of the vehicle seat 1, a location of the first axis A1 is different from a location of the fourth axis A4 and a location of the third axis A3 is different from a location of the second axis A2. This applies in particular to the non-deflected state and to the parallel embodiment (see FIG. 7*a*, 7*b*).

Moreover, a fifth distance D5 between the fifth axis A5 and the common axis 7 is preferably identical to a sixth distance D6 between the sixth axis A6 and the common axis A7. This describes that the second lever member 52 is in the present case mounted eactly centrally about the common axis 7 in relation to its longitudinal extension (see the uppermost representation according to FIG. 7*a*).

Furthermore, in the present case a seventh distance D7 between the first axis A1 and the common axis 7 is identical to an eighth distance D8 between the second axis A2 and the common axis 7. This describes that the fourth lever member 60 is in the present case mounted exactly centrally about the common axis in relation to its longitudinal extension (see the uppermost representation according to FIG. 7*a*).

In particular, FIGS. 7*a*, 7*b* and 8*a*, 8*b* now show two preferred embodiments of the present invention.

The first preferred embodiment is shown according to FIGS. 7*a* and 7*b* and is referred to as a "parallel scissor frame" in the context of the present invention. It provides that, in the event of an oscillation of the scissor frame 4, i.e. a twisting of the scissor arm members 5 and 6 about the common axis 7, a connecting line 13 between the first A1 and the third axis A3 can always be mapped parallel to an initial position of the connecting line 13, regardless of the momentary position of the scissor arm members 5 and 6 relative to each other.

According to FIGS. 7*a* and 7*b*, this connecting line 13 is always parallel to the longitudinal direction 1*x* of the vehicle seat 1 and to a connecting line 24 between the second A2 and the fourth axis A4. It is thus described that the oscillation of the scissor frame 4 causes a change in the position of the connecting line 13 only in relation to a pure translation in the longitudinal direction 1*x* and in the height direction 1*z* of the vehicle seat 1. This can be clearly seen from a comparison of the states of the vehicle seat 1 according to FIG. 7*b*, whereupon the seat surface always lowers in parallel with the longitudinal direction 1*x*.

For example, the first axis A1 moves about 40 mm backwards and about 120 mm downwards while passing through a change in height from the first maximum state to the second maximum state (see FIG. 5 as well as the locations A1', A3', A5', A6', 7' of the corresponding axes A1, A3, A5, A6, 7 according to the first maximum state and the locations A1", A3", A5", A6", 7" of the corresponding axes A1, A3, A5, A6, 7 according to the second maximum state).

The parallel scissor frame 4 according to FIG. 7*a*, 7*b* has a point symmetry in relation to a point of symmetry which is formed by the common axis 7. This point symmetry is considered in a plane which is spanned by the longitudinal direction 1*x* and the height direction 1*z* of the vehicle seat 1.

Figure 8A:
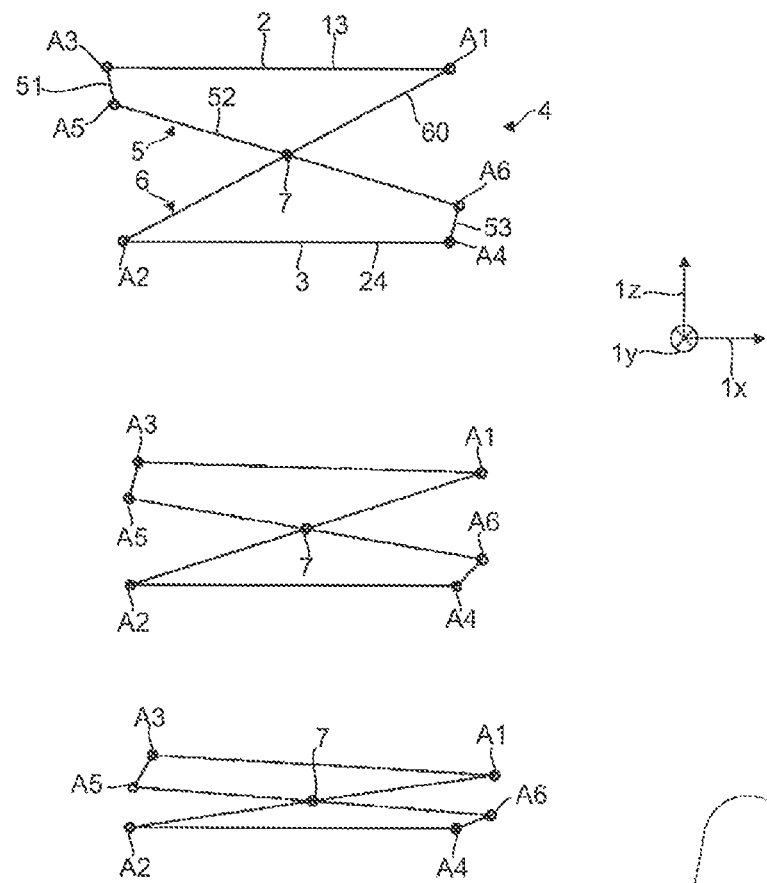
FIG. 8a; 8b are schematic representations of the kinematics of a second embodiment of the present invention.
Figure 8B:
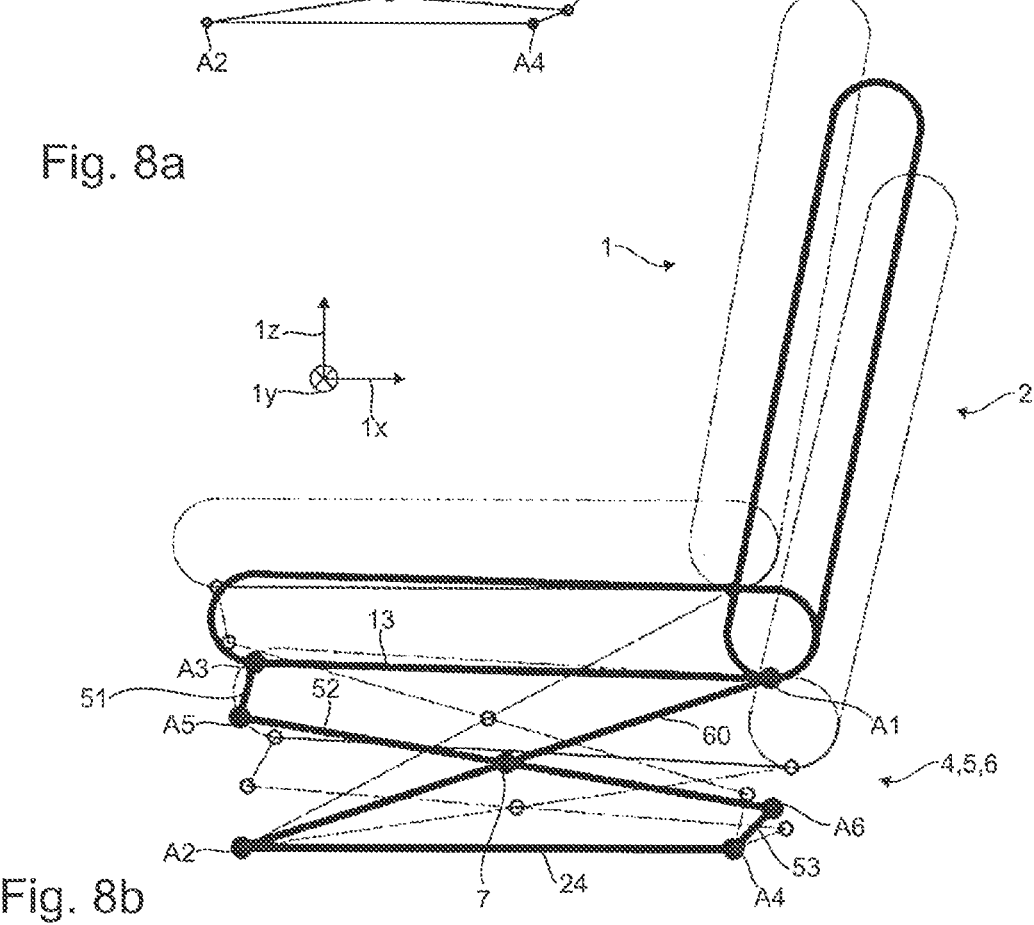

The second preferred embodiment is shown according to FIGS. 8a and 8b and is referred to as a "non-parallel scissor frame" in the context of the present invention.

In particular, a comparison of the states of the vehicle seat 1 according to FIG. 8b shows that the seat surface does not lower parallel to the longitudinal direction 1x, but that during the oscillation of the scissor frame 4, the connecting line 13 is arranged with a variable degree of inclination to the connecting line 24, depending on the momentary position of the scissor arm members 5 and 6 relative to each other. It is thus described that the oscillation of the scissor frame 4 causes a change in the position of the connecting line 13 in relation to a translation in the longitudinal direction 1x and in the height direction 1z of the vehicle seat 1z and in relation to a rotation about a virtual axis running in the width direction 1y of the seat 1.

For example, while passing through a height change from the first maximum state to the second maximum state, connecting line 13 undergoes an angle change with respect to connecting line 24 of 3° or more than 3° (for example, from a value of 0° in the first maximum position to a value of 3° in the second maximum position).

The non-parallel scissor frame 4 as shown in FIGS. 8a and 8b has no point symmetry in relation to the point of symmetry formed by the common axis 7. This point symmetry is considered in a plane which is spanned by the longitudinal direction 1x and the height direction 1z of the vehicle seat 1.

It is understood that the embodiments explained above are merely a first configuration of the vehicle seat according to the invention. In this respect, the configuration of the invention is not limited to these embodiments.

All features disclosed in the application documents are claimed as being essential to the invention, provided they are, individually or in combination, novel compared to the prior art.

LIST OF REFERENCE SIGNS

1 Vehicle seat
1x Longitudinal direction
1y Width direction
1z Height direction
−1z Downward direction
2 Upper part
3 Lower part
4 Scissor frame
5, 6 Scissor arm member
7, A1, . . . , A6 Axis
8 Damper member
9 Spring member
10, 11 End
13, 13', 24, 57, 57' Connecting line
51, 52, 53, 60 Lever member
A1', A1", A3', A3", A5', A5", A6', A6", A3*, A3**, A5*, A5**, 7', 7" Location
D1, . . . , D8 Distance
D* Ergonomic distance
F Driver
K Vehicle cab
S Shoulder joint
W Operating member

What is claimed is:

1. A vehicle seat comprising:
an upper part, which is height-adjustably mounted with respect to a lower part by at least one scissor frame,
wherein the scissor frame comprises a first scissor arm member and a second scissor arm member, which are pivotally mounted about a common axis,
wherein the second scissor arm member comprises an integral fourth lever member, which is pivotally mounted with respect to the upper part about a first axis and with respect to the lower part about a second axis,
wherein the first scissor arm member comprises a first, a second and a third lever member which are series-connected,
wherein the first lever member is pivotally mounted with respect to the upper part about a third axis,
wherein the third lever member is pivotally mounted with respect to the lower part about a fourth axis,
wherein the second lever member is pivotally mounted about the common axis and is rotationally connected to the first lever member by a fifth axis and rotationally connected to the third lever member by a sixth axis, and
wherein a relative position of at least one of the third axis, the fourth axis, the fifth axis, or the sixth axis is adjustable relative to the common axis in at least one of a longitudinal direction or a height direction of the vehicle seat.

2. The vehicle seat according to claim 1, wherein in relation to the longitudinal direction of the vehicle seat, the third axis and the second axis are arranged at a front end of the vehicle seat.

3. The vehicle seat according to claim 1, wherein the integral fourth lever member is longer than the second lever member and/or that the second lever member is longer than the first lever member and/or that the second lever member is longer than the third lever member.

4. The vehicle seat according to claim 1, wherein a first distance between the third axis and the fifth axis is identical to a second distance between the fourth axis and the sixth axis.

5. The vehicle seat according to claim 1, wherein a third distance between the third axis and the fourth axis is smaller than a fourth distance between the first axis and the second axis.

6. The vehicle seat according to claim 1, wherein, in relation to the height direction of the vehicle seat, a location of the first axis is identical to a location of the third axis and/or a location of the second axis is identical to a location of the fourth axis.

7. The vehicle seat according to claim 1, wherein a seventh distance between the first axis and the common axis is identical to an eighth distance between the second axis and the common axis.

8. The vehicle seat according to claim 1, wherein in relation to the longitudinal direction of the vehicle seat, a location of the first axis is different from a location of the fourth axis and/or a location of the third axis is different from a location of the second axis.

9. The vehicle seat according to claim 1, wherein a fifth distance between the fifth axis and the common axis is identical to a sixth distance between the sixth axis and the common axis.

10. A vehicle seat comprising:
an upper part, which is height-adjustably mounted with respect to a lower part by at least one scissor frame,
wherein the scissor frame includes a first scissor arm member and a second scissor arm member, which are pivotally mounted about a common axis,
wherein the second scissor arm member comprises an integral fourth lever member, which is pivotally mounted with respect to the upper part about a first axis and with respect to the lower part about a second axis, wherein the first scissor arm member comprises a first, a second and a third lever member which are series-connected, wherein the first lever member is pivotally mounted with respect to the upper part about a third axis, wherein the third lever member is pivotally mounted with respect to the lower part about a fourth axis, wherein the second lever member is pivotally mounted about the common axis and is rotationally connected to the first lever member by a fifth axis and rotationally connected to the third lever member by a sixth axis, and wherein a first distance between the third axis and the fourth axis is smaller than a second distance between the first axis and the second axis.

11. The vehicle seat according to claim 10, wherein, in relation to a longitudinal direction of the vehicle seat, at least one of a location of the first axis is different from a location of the fourth axis or a location of the third axis is different from a location of the second axis.

12. The vehicle seat according to claim 10, wherein, in relation to a longitudinal direction of the vehicle seat, the third axis and the second axis are arranged at a front end of the vehicle seat.

13. The vehicle seat according to claim 10, wherein at least one of the integral fourth lever member is longer than the second lever member or the second lever member is longer than at least one of the first lever member or the third lever member.

14. The vehicle seat according to claim 10, wherein a third distance between the third axis and the fifth axis is identical to a fourth distance between the fourth axis and the sixth axis.

15. A vehicle seat comprising:
an upper part, which is height-adjustably mounted with respect to a lower part by at least one scissor frame,
wherein the scissor frame comprises a first scissor arm member and a second scissor arm member, which are pivotally mounted about a common axis, wherein the second scissor arm member comprises an integral fourth lever member, which is pivotally mounted with respect to the upper part about a first axis and with respect to the lower part about a second axis, wherein the first scissor arm member comprises a first, a second and a third lever member which are series-connected, wherein the first lever member is pivotally mounted with respect to the upper part about a third axis, wherein the third lever member is pivotally mounted with respect to the lower part about a fourth axis, wherein the second lever member is pivotally mounted about the common axis and is rotationally connected to the first lever member by a fifth axis and rotationally connected to the third lever member by a sixth axis, and wherein, in relation to a height direction of the vehicle seat, a location of the first axis is identical to a location of the third axis and/or a location of the second axis is identical to a location of the fourth axis.

16. The vehicle seat according to claim 15, wherein, in relation to a longitudinal direction of the vehicle seat, a location of the first axis is different from a location of the fourth axis and/or a location of the third axis is different from a location of the second axis.

17. The vehicle seat according to claim 15, wherein, in relation to a longitudinal direction of the vehicle seat, the third axis and the second axis are arranged at a front end of the vehicle seat.

18. The vehicle seat according to claim 15, wherein the integral fourth lever member is longer than the second lever member and/or that the second lever member is longer than the first lever member and/or that the second lever member is longer than the third lever member.

19. The vehicle seat according to claim 15, wherein a first distance between the third axis and the fifth axis is identical to a second distance between the fourth axis and the sixth axis.

* * * * *